J. P. PROBST.
FILTER.
APPLICATION FILED JUNE 12, 1919.
1,367,325.
Patented Feb. 1, 1921.
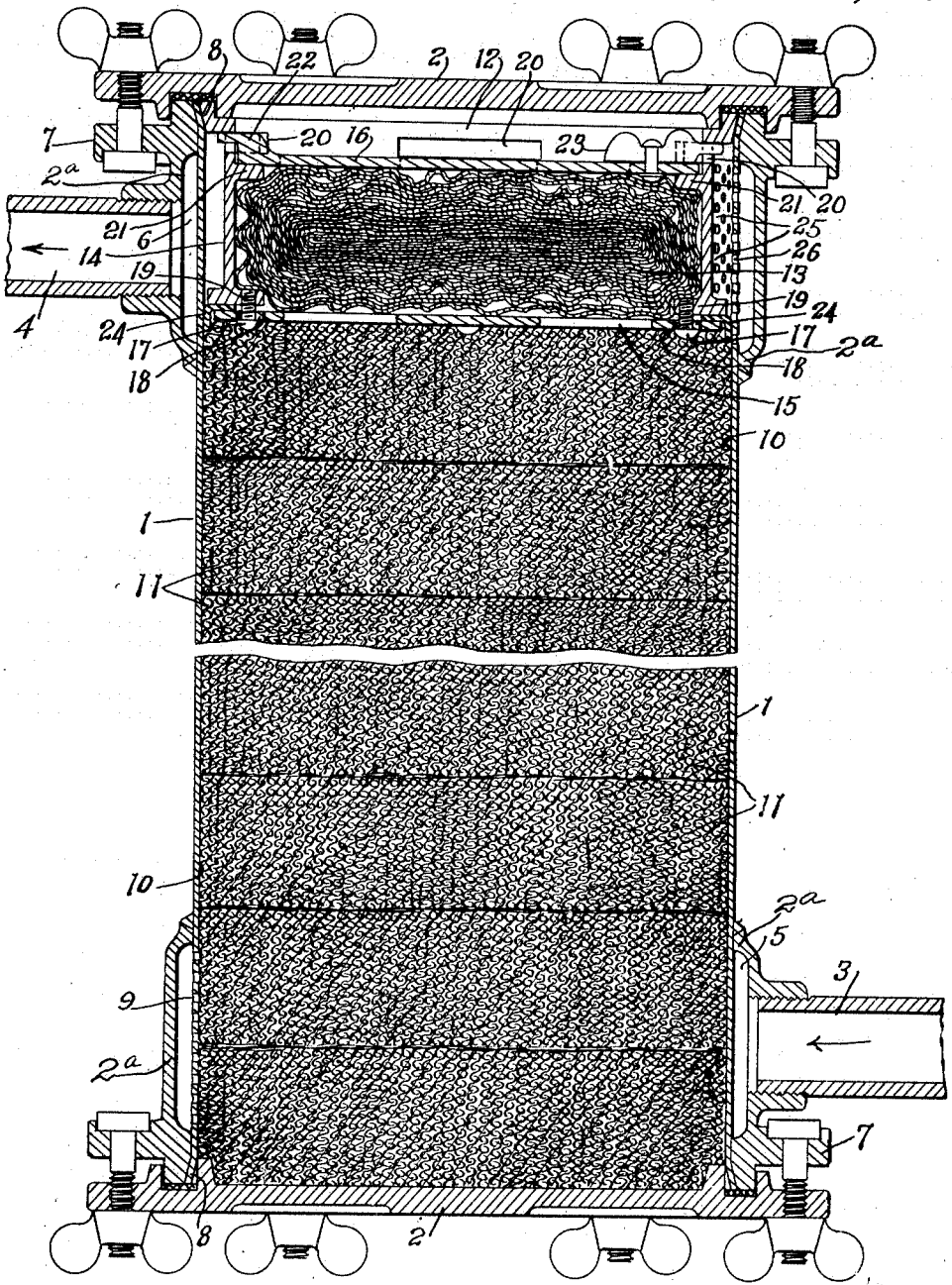
Inventor
John Philip Probst
his Attorney

UNITED STATES PATENT OFFICE.

JOHN P. PROBST, OF MARION, OHIO.

FILTER.

1,367,325.   Specification of Letters Patent.   Patented Feb. 1, 1921.

Application filed June 12, 1919. Serial No. 303,666.

*To all whom it may concern:*

Be it known that I, JOHN P. PROBST, a citizen of the United States, residing at Marion, in the county of Marion and State of Ohio, have invented certain new and useful Improvements in Filters, of which the following is a specification, reference being had therein to the accompanying drawing.

This invention relates to filters and has for its object to provide an improved filter of the type disclosed in Patent No. 1,247,875, issued to me November 27th, 1917, and disclosed in a later improved form in my two copending applications for Letters Patent, Ser. No. 276,986, filed Feb. 14, 1919, and Ser. No. 283,028, filed March 17, 1919.

In filters of this character it is essential, if effective filtration is to be realized, that the filtering material be of such a character and arranged in the filter casing in such a manner that the pressure of the liquid will not form open channels therethrough, thus permitting the liquid or at least a portion of it to be delivered through the filter without passing through the filtering material, thereby rendering the filter ineffective.

This is a common fault in filtering devices of earlier construction, the correction of which has been applied in the present invention and in each of my co-pending applications referred to.

In the present invention this subject has received particular attention to insure the effectiveness of the filter and for the further purpose of commercial standardization of the filter.

As disclosed in a copending application for Letters Patent on a filtering process, Ser. No. 303,665, filed coincident therewith, it has been found generally advantageous and desirable to standarize a filtering unit of a size suitable for the average one-family residence, and to use these units plurally, in various forms of serial combinations, in larger houses and places where greater capacity of the filters is required.

The standard filter thus contemplated is of a size that requires only a single sponge, which is the preferred filtering material, to fill the cylinder casing laterally, the sponges being depressed both laterally and longitudinally to a suitable extent and placed one upon the other in the filter casing, thus filling the entire portion thereof and acting effectually to prevent the formation of channels between or around the sponges through which the liquid could flow without passing through the filtering material.

As in the improved filter disclosed in my copending application, Ser. No. 283,028, above referred to, the present invention has the improved means for disrupting the stream or flow of the liquid as it is introduced into the filter by causing the liquid to enter the filter casing through a perforated wall, thereby obtaining equal distribution thereof through the filtering material, and tending further to avoid the formation of pools or pockets in the filter through which the liquid would not flow freely and thus would become more or less stagnant.

Where sponges are used as the filtering material it has been found that small, fine portions of the sponges become detached from the sponge body and to an objectionable extent may be carried off with the liquid as it is delivered from the filter.

The present invention has the further improvement of means providing for a second filtering process through a different kind of material whereby any sponge particles or other foreign substances remaining in the liquid after the same has passed through the first filtering process will be removed therefrom in the second process.

My improved filters are especially adaptable for domestic use, but may, of course, be used generally under all suitable conditions where devices of this character are employed. For domestic use the filters are used for removing foreign substances and impurities of all kinds such as accumulate in rain water cisterns and city water service pipes and remaining in the water as the same is drawn for use in the residence.

To meet this requirement the filters are of simple, substantial construction, cheap to manufacture and install, and do not require attention after they are once installed other than occasional cleansing. To this end the filters are so constructed that they may be readily opened and the filtering material removed, and again replaced after cleansing.

In the accompanying drawing, the figure is a vertical section of the filter taken substantially through the center thereof and showing the arrangement whereby the primary and secondary filtering operations are accomplished.

The body portion of the filter consists of the usual cylindrical casing 1 which in the present construction is preferably formed of metal. Both ends of the casing are open and may be closed in any suitable manner to form water tight ends.

Each end of the casing as here shown is provided with an integral casting 2ª in which the intake port 3 and outlet port 4 are located respectively. The castings are provided with inner depressed portions which form annular channels between the casting and the casing and constitute, respectively, the receiving and distributing chamber 5 and collecting and delivering chamber 6. The castings are further provided with outwardly projecting flanges 7 by means of which the end covers 2 may be secured to the casing.

The casting 2ª may be secured to the casing in any suitable manner. As here shown the edges of the cylinder walls are preferably flared outwardly, as indicated at 8, to form a tight joint with the inner edge of the casting 2ª. A tight joint between the opposite edge of the casting and the casing may be obtained by soldering or brazing the joint.

The lower portion of the cylindrical casing over the entire periphery thereof except the portion immediately opposite the intake port 3, as here shown, is provided with perforations or apertures 9 which admit the liquid introduced through the port 3 under pressure into the distributing chamber 5, and then into the filtering chamber 10 which may be filled with any suitable filtering material, the annular distributing chamber and the perforated wall serving to introduce the liquid evenly to all portions of the filtering material, and the perforated walls acting to disrupt the flow of the liquid as it passes therethrough.

As stated, the filtering material in the chamber 10 where the primary filtering operation takes place consists preferably of single sponges 11 of a suitable size to completely fill the chamber laterally, the sponges being disposed one upon the other and compressed both laterally and longitudinally to the desired extent to form a filtering mesh of suitable fineness.

The upper portion of the casing 1, as here shown, is occupied by a filtering chamber 12, in which the secondary filtering operation takes place. The filtering material 13 used in the secondary chamber may consist of compressed gauze, linen, or any suitable material which will act to remove any foreign material substances remaining in the liquid after the same has passed through the primary filtering operation.

The secondary chamber 12 is formed in the casing 1 by an inner cylindrical casing 14, having a detachable, webbed bottom 15 and top 16; the bottom being secured to the casing 14 by screws 17 which extend through elongated screw holes 18, formed in the bottom plate to enable easy assembling thereof to the casing, and are threaded into lugs 19 formed integrally with the casing wall.

The upper portion of the casing 14 is provided with a series of circumferentially extending apertures 20, and with inwardly projecting lugs 21 upon which the cover plate rests. The cover plate 16 has a lug 22 adapted to be projected through one of the apertures 20, and a latch 23 adapted to engage the opposite aperture whereby the plate may be securely held in place in the top of the casing.

Secured to the lower edge of the casing 14 by the bottom plate 15 is a suitable gasket 24 which serves to form a substantially water-tight joint between the lower end of the casing 14 and the casing 1, thus causing all the liquid to pass into and through the secondary filtering chamber, and through the top plate 16 and apertures 20, thence downwardly into an annular channel 25 formed in the periphery of the casing 14. From the channel 25 the liquid passes through perforations 26 in the upper wall of the casing 1, into the delivering chamber 6 from which it may be drawn from the filter in any suitable manner through the outlet port 4.

The extent and arrangement of the perforations of the wall of the casing 1 may be varied as desired. As here shown the portions of the wall adjacent the inlet and outlet ports are preferably imperforated, in the first instance to prevent the liquid entering the filter in full flow or in a stream from the service pipe, the annular receiving chamber and the perforated wall coöperating therewith acting to disrupt the flow of the liquid and evenly distributing the same as it enters the filtering material in the primary operation. The imperforated portion of the casing at the top, coöperating with the outlet port, serves to cause all the liquid to flow through the perforated wall into the delivery chamber, and thus to prevent any portion of the liquid being discharged directly from the filter into the outlet port.

Having thus fully described my invention, what I claim as new and desire to secure by Letters Patent, is:—

1. In a filter, a casing having inlet and outlet ports and a chamber adapted to receive liquid from the inlet port, said chamber having layers of sponges each consisting of a single piece superimposed therein and compressed to fill said chamber and acting to effect primary filtration of said liquid and a chamber in said casing adapted to receive the liquid from the first chamber; said second chamber being complete in itself and detachable from the casing and having irregular layers of crushed cloth arranged therein to effect secondary filtration of said liquid.

2. In a filter, a main casing having a chamber therein filled with suitable material to effect primary filtration of liquid, and a chamber coöperating with the first chamber to receive the liquid therefrom, said second chamber being within the main casing and having suitable material therein to effect further filtration of said liquid, an annular delivery channel externally of the main casing, and an annular distributing channel externally of the secondary chamber, an apertured portion of the main casing between said channels, whereby the liquid is conducted from the second chamber to an outlet of the filter.

3. In a filter, a main casing having a chamber therein filled with suitable material to effect primary filtration of liquid, and a chamber coöperating with the first chamber to receive the liquid therefrom, said second chamber being within the main casing and having suitable material therein to effect further filtration of said liquid, a liquid passage externally of the main casing and a liquid passage externally of the secondary chamber, a perforated portion of the main casing between said channels whereby the liquid is conducted from the second chamber to an outlet of the filter.

In testimony whereof I affix my signature.

JOHN P. PROBST.